(12) United States Patent
Churcher et al.

(10) Patent No.: US 11,560,798 B2
(45) Date of Patent: Jan. 24, 2023

(54) COMPONENT SHIELDING

(71) Applicant: Rolls-Royce plc, London (GB)

(72) Inventors: David Churcher, London (GB); Andrew R. Collis, London (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/286,327

(22) PCT Filed: Sep. 30, 2019

(86) PCT No.: PCT/EP2019/076480
§ 371 (c)(1),
(2) Date: Apr. 16, 2021

(87) PCT Pub. No.: WO2020/078707
PCT Pub. Date: Apr. 23, 2020

(65) Prior Publication Data
US 2021/0388726 A1  Dec. 16, 2021

(30) Foreign Application Priority Data
Oct. 17, 2018 (GB) .................................... 1816894

(51) Int. Cl.
*F01D 5/14* (2006.01)
*B29C 65/70* (2006.01)
(Continued)

(52) U.S. Cl.
CPC .............. *F01D 5/147* (2013.01); *B29C 65/70* (2013.01); *F01D 5/288* (2013.01);
(Continued)

(58) Field of Classification Search
CPC ......... F01D 5/147; F01D 5/288; B29C 65/70; B29K 2105/256; B29L 2031/08; F05D 2230/90; F05F 2240/121
See application file for complete search history.

(56) References Cited

U.S. PATENT DOCUMENTS 4,842,663 A    6/1989   Kramer
5,876,651 A *   3/1999   Blackburn, Jr. ........ F01D 5/282
                                                   29/889.71
(Continued)

FOREIGN PATENT DOCUMENTS

EP        0610762 A2 *   8/1994
EP        0813956 A1    12/1997
(Continued)

OTHER PUBLICATIONS

Remarks filed in the European Patent Office on Feb. 25, 2021 in corresponding application 19783251.2 (Year: 2021).*
(Continued)

*Primary Examiner* — Topaz L. Elliott
(74) *Attorney, Agent, or Firm* — Banner & Witcoff, Ltd.

(57) ABSTRACT

A method of manufacturing a component for a gas turbine engine includes applying a thermoplastic polymer sheet over a composite body for the component; applying a shield over part of the composite body, the shield terminating at an end which overlies the thermoplastic polymer sheet and defines an interface between shielded and unshielded regions of the component; and pressing the shield into the thermoplastic polymer sheet so that the thermoplastic polymer sheet deforms around the end of the shield, such that the exterior profile of the component at the interface between the shielded and unshielded regions is flush.

16 Claims, 5 Drawing Sheets

(51) Int. Cl.
  *B29K 75/00* (2006.01)
  *B29K 105/00* (2006.01)
  *B29L 31/08* (2006.01)
  *F01D 5/28* (2006.01)

(52) U.S. Cl.
  CPC .... *B29K 2075/00* (2013.01); *B29K 2105/256* (2013.01); *B29L 2031/08* (2013.01); *F05D 2220/32* (2013.01); *F05D 2230/20* (2013.01); *F05D 2240/24* (2013.01)

(56) References Cited

U.S. PATENT DOCUMENTS

| | | | | |
|---|---|---|---|---|
| 10,138,738 B2 * | 11/2018 | Obuchi | | F04D 29/542 |
| 10,266,247 B2 * | 4/2019 | Aliaga | | F01D 5/147 |
| 10,899,051 B2 * | 1/2021 | Pautard | | B29C 45/14336 |
| 2011/0049297 A1 * | 3/2011 | Jevons | | F01D 5/284 |
| | | | | 156/927 |
| 2012/0134844 A1 * | 5/2012 | Bottome | | F02K 3/06 |
| | | | | 416/245 R |
| 2016/0009369 A1 * | 1/2016 | Aliaga | | B64C 27/473 |
| | | | | 416/224 |
| 2016/0152320 A1 * | 6/2016 | Kling | | B64C 11/14 |
| | | | | 60/722 |
| 2016/0159488 A1 | 6/2016 | Roach et al. | | |
| 2016/0160659 A1 * | 6/2016 | Obuchi | | F01D 5/147 |
| | | | | 415/200 |
| 2016/0167269 A1 * | 6/2016 | Pautard | | B29C 45/14336 |
| | | | | 264/259 |
| 2018/0209400 A1 * | 7/2018 | Drachmann Haag | | |
| | | | | B32B 27/308 |
| 2020/0191001 A1 * | 6/2020 | Okabe | | F01D 25/00 |
| 2020/0300099 A1 * | 9/2020 | Fabre | | F04D 29/324 |
| 2021/0010377 A1 * | 1/2021 | Blanquart | | F01D 5/282 |
| 2022/0120186 A1 * | 4/2022 | Barnett | | F01D 5/288 |

FOREIGN PATENT DOCUMENTS

| | | | | |
|---|---|---|---|---|
| EP | 2022942 | A1 | 2/2009 | |
| EP | 3037675 | A1 | 6/2016 | |
| EP | 3015646 | B1 * | 12/2019 | B23K 31/02 |
| ES | 2322638 | A1 * | 6/2009 | B29C 51/02 |
| FR | 2992889 | A1 | 1/2014 | |
| FR | 3049002 | A1 | 9/2017 | |
| GB | 2554476 | A | 4/2018 | |
| JP | 2005214147 | A * | 8/2005 | B29C 51/02 |
| WO | 96/00842 | A1 | 1/1996 | |
| WO | 96/01288 | A2 | 1/1996 | |
| WO | WO-2014196987 | A2 * | 12/2014 | F01D 5/147 |
| WO | WO-2018059768 | A1 * | 4/2018 | B23K 31/02 |

OTHER PUBLICATIONS

Jan. 27, 2020—(WO) International Search Report & Written Opinion—App. No. PCT/EP2019/076480.

Mar. 21, 2019—(GB) Search Report—App. No. 1816894.8.

* cited by examiner

COMPONENT SHIELDING

CROSS-REFERENCE TO RELATED APPLICATIONS

This application is a U.S. National Stage Application under 35 U.S.C. § 371 of International Application No. PCT/EP2019/076480, filed Sep. 30, 2019, which claims the benefit of priority to United Kingdom Application No. GB 1816894.8, filed Oct. 17, 2018, and the present application claims the benefit of the filing date of both of these prior applications, which are incorporated by reference in their entireties.

FIELD

The present disclosure concerns components for a gas turbine engine and methods of manufacturing such components.

BACKGROUND

Modern gas turbine engines may include components made of composite materials such as fibre-reinforced polymers. Examples of composite components found in gas turbine engines include composite fan blades, composite guide vanes and composite nose cones. Depending on the composite material used, such composite components can meet the strength, stiffness and weight requirements of aerospace applications. However, exposed composite components can be vulnerable to foreign object impact damage and surface erosion.

In order to mitigate surface erosion, composite components have previously been provided with wear-resistant thermosetting polymer coatings. Regions of composite components vulnerable to impact damage have also been protected using shields (such as metal or rubber shields). However, it can be difficult to achieve a flush interface between a shield and the remainder of the composite component or wear-resistant coating which does not reduce aerodynamic performance. Current methods of manufacturing shielded composite components can also be complex and time-consuming.

SUMMARY

According to a first aspect, there is provided a method of manufacturing a component for a gas turbine engine, the method comprising: applying a thermoplastic polymer sheet over a composite body for the component; applying a shield over part of the composite body, the shield terminating at an end which overlies the thermoplastic polymer sheet and defines an interface between shielded and unshielded regions of the component; and pressing the shield into the thermoplastic polymer sheet so that the thermoplastic polymer sheet deforms around the end of the shield, such that the exterior profile of the component at the interface between the shielded and unshielded regions is flush.

The shield may provide the shielded region of the component with improved impact resistance. The thermoplastic polymer sheet may provide the unshielded region with improved erosion resistance. Maintenance of a flush (i.e. continuous) interface between shielded and unshielded regions of the exterior profile of the component is important to enable smooth fluid (e.g. air) flow across said exterior profile during use in a gas turbine engine.

It will be appreciated that a thermoplastic polymer is a polymer which becomes pliable or mouldable at elevated temperatures, particularly at temperatures above the polymer's glass transition temperature ($T_g$) but below the polymer's melting temperature ($T_m$). Thermoplastic polymers can be contrasted with thermosetting polymers which generally undergo chemical crosslinking on heating, thereby forming infusible, insoluble polymer networks which can no longer be moulded. A thermoplastic polymer, particularly above $T_g$, is able to undergo substantial amounts of plastic flow in response to an applied stress.

Accordingly, the method may comprise pressing the shield into the thermoplastic polymer sheet so that the thermoplastic polymer sheet flows (e.g. plastically flows) around the end of the shield, such that the exterior profile of the component at the interface between the shielded and unshielded regions is flush.

By forming a flush interface between the shielded and unshielded regions through deformation of the thermoplastic polymer sheet around the end of the shield, time-consuming component processing steps such as chamfering of a polymer coating and/or manual dressing of the interface are not necessary. In contrast, such processes are generally required when forming a flush interface between, for example, a shield and a thermosetting polymer wear-resistant layer.

The method may comprise pressing the shield into the thermoplastic polymer sheet so that the thermoplastic polymer sheet deforms around the end of the shield such that the thermoplastic polymer sheet has a discontinuous (e.g. variable) thickness at the end of the shield.

The method may comprise pressing the shield into the thermoplastic polymer sheet so that the thermoplastic polymer sheet deforms around the end of the shield such that the thickness of the thermoplastic polymer sheet between the shield and the composite body in the shielded region is reduced relative to the thickness of the thermoplastic polymer sheet in the unshielded region and/or relative to the thickness of the thermoplastic polymer sheet prior to application to the composite body.

The method may comprise pressing the shield into the thermoplastic polymer sheet so that the thermoplastic polymer sheet deforms around the end of the shield such that the thickness of the thermoplastic polymer sheet between the shield and the composite body in the shielded region is reduced by at least 10%, for example, at least 20%, or at least 30%, or at least 40%, relative to the thickness of the thermoplastic polymer sheet in the unshielded region and/or relative to the thickness of the thermoplastic polymer sheet prior to application to the composite body. The method may comprise pressing the shield into the thermoplastic polymer sheet so that the thermoplastic polymer sheet deforms around the end of the shield such that the thickness of the thermoplastic polymer sheet between the shield and the composite body in the shielded region is no greater than 90%, for example, no greater than 80%, or no greater than 70%, or no greater than 60%, of the thickness of the thermoplastic polymer sheet in the unshielded region and/or of the thickness of the thermoplastic polymer sheet prior to application to the composite body. The method may comprise pressing the shield into the thermoplastic polymer sheet so that the thermoplastic polymer sheet deforms around the end of the shield such that a ratio of the thickness of the thermoplastic polymer sheet between the shield and the composite body in the shielded region to the thickness of the thermoplastic polymer sheet in the unshielded region and/or to the thickness of the thermoplastic polymer sheet prior to application to the composite body is between about 1:2 and about 9:10.

The method may comprise pressing the shield into the thermoplastic polymer sheet using a tool. For example, the method may comprise applying pressure to the shield through the tool. The tool may be a tool which defines a profile (e.g. the exterior profile) for the component. The tool may be a mould. The tool may be a pressure intensifier mould, for example a silicone rubber pressure intensifier mould. The pressure intensifier mould may be flexible. The pressure intensifier mould may itself may be a moulding of a mould used in shaping the composite body for the component. The tool may be a caul plate, for example a metal caul plate.

The method may comprise heating the thermoplastic polymer sheet (for example, heating the thermoplastic polymer sheet and the shield and/or the composite body). The method may comprise heating the thermoplastic polymer sheet (for example, the thermoplastic polymer sheet and the shield and/or the composite body) before or during pressing the shield into the thermoplastic polymer sheet. The method may comprise heating the thermoplastic polymer sheet (e.g. the thermoplastic polymer sheet and the shield and/or the composite body) to a temperature which is greater than the glass transition temperature ($T_g$) of the thermoplastic polymer. The method may comprise heating the thermoplastic polymer sheet (e.g. the thermoplastic polymer sheet and the shield and/or the composite body) to a temperature which is greater than the glass transition temperature ($T_g$) of the thermoplastic polymer but below the melting temperature ($T_m$) of the thermoplastic polymer. The method may comprise heating the thermoplastic polymer sheet (e.g. the thermoplastic polymer sheet and the shield and/or the composite body) to a temperature greater than about 60° C., for example, greater than about 70° C., or greater than about 80° C., or greater than about 90° C., or greater than about 100° C., or greater than about 110° C., or greater than about 120° C., or greater than about 130° C., or greater than about 140° C., or greater than about 150° C., or greater than about 160° C., or greater than about 170° C. The method may comprise heating the thermoplastic polymer sheet (e.g. the thermoplastic polymer sheet and the shield and/or the composite body) to a temperature lower than about 250° C., for example, lower than about 240° C., or lower than about 230° C., or lower than about 220° C., or lower than about 210° C., or lower than about 200° C. The method may comprise heating the thermoplastic polymer sheet (e.g. the thermoplastic polymer sheet and the shield and/or the composite body) to a temperature from about 60° C. to about 250° C., for example, from about 80° C. to about 230° C., or from about 90° C. to about 220° C., or from about 100° C. to about 210° C., or from about 120° C. to about 200° C., or from about 90° C. to about 180° C.

The method may comprise applying at least about 1 bar (gauge), for example, at least about 2 bar (gauge), or at least about 3 bar (gauge), of pressure to the shield, the thermoplastic polymer sheet and the composite body. The method may comprise applying no greater than about 4 bar (gauge), for example, no greater than about 3 bar (gauge), or no greater than about 2 bar (gauge), of pressure to the shield, the thermoplastic polymer sheet and the composite body. The method may comprise applying from about 1 bar to about 4 bar of pressure to the shield, the thermoplastic polymer sheet and the composite body.

The method may comprise applying heat and/or pressure to the shield, the thermoplastic polymer sheet and the composite body for at least about 1 hour, or at least about 2 hours, or at least about 3 hours. The method may comprise applying heat and/or pressure to the shield, the thermoplastic polymer sheet and the composite body for no greater than about 10 hours, or no greater than about 8 hours, or no greater than about 6 hours. The method may comprise applying heat and/or pressure to the shield, the thermoplastic polymer sheet and the composite body for between about 2 hours and about 6 hours.

The method may comprise applying pressure to the shield, the thermoplastic polymer sheet and the composite body in an autoclave. The method may comprise applying both heat and pressure to the shield, the thermoplastic polymer sheet and the composite body in an autoclave. The method may comprise heating the shield, the thermoplastic polymer sheet and the composite body in an oven.

The thermoplastic polymer sheet may comprise (e.g. be formed from) one or more thermoplastic polymers, for example one or more thermoplastic elastomeric polymers. The thermoplastic polymer sheet may comprise (e.g. be formed from) one or more copolymers, for example one or more block copolymers.

It may be that the thermoplastic polymer sheet comprises (e.g. is formed from) thermoplastic polyurethane (TPU), for example thermoplastic elastomeric polyurethane. It will be appreciated that thermoplastic polyurethane (e.g. thermoplastic elastomeric polyurethane) is a block copolymer comprising alternating sequences of hard and soft polymer segments formed on reaction of diisocyanates with both short-chain diols and long-chain diols. It may be that the thermoplastic polymer sheet comprises (e.g. is formed from) polyester-based thermoplastic polyurethane, for example polyester-based thermoplastic elastomeric polyurethane.

The thermoplastic polymer sheet may have a thickness (i.e. a thickness prior to application to the composite body and/or a thickness in the unshielded region) from about 0.1 mm to about 1.0 mm, for example, from about 0.2 mm to about 0.8 mm, or from about 0.3 mm to about 0.6 mm. The thermoplastic polymer sheet may have a substantially uniform thickness prior to application to the composite body.

The shield may comprise (e.g. be formed from) metal. It may be that the shield is a metal shield. The metal shield may comprise (e.g. be formed from) any suitable metal or metal alloy. The metal shield may comprise (e.g. be formed from) titanium or one or more titanium alloys. The shield may comprise (e.g. be formed from) sheet metal. The shield (e.g. the sheet metal) may have a thickness from about 0.1 mm to about 1.0 mm, for example, from about 0.2 mm to about 0.9 mm, or from about 0.3 mm to about 0.8 mm, or from about 0.3 mm to about 0.7 mm, or from about 0.3 mm to about 0.6 mm, or from about 0.3 mm to about 0.5 mm, towards the end which overlies the thermoplastic polymer sheet.

The shield may comprise (e.g. be formed from) polymeric material. The shield may comprise (e.g. be formed from) elastomeric material, e.g. one or more elastomeric polymers. The elastomeric material may comprise (e.g. be) one or more thermosetting elastomeric polymers or one or more thermoplastic elastomeric polymers. The shield may comprise (e.g. be formed from) natural or synthetic rubber, for example vulcanized rubber.

The composite body may comprise (e.g. be formed from) fibre-reinforced composite material, for example fibre-reinforced polymeric material. The fibre-reinforced composite material may comprise reinforcing fibres made of, for example, glass, carbon or aramids (e.g. para-aramids such as Kevlar® or Twaron®). The reinforcing fibres may be suspended in a thermosetting polymeric matrix, for example an epoxy resin matrix. The composite body may comprise (e.g. be formed from) glass-fibre reinforced plastic (GFRP or fibreglass) or carbon-fibre reinforced plastic (CFRP).

It may be that the end of the shield is chamfered. Alternatively, it may be that the end of the shield is not chamfered. It may be easier to manufacture a shield having an end which is not chamfered.

The method may comprise applying the thermoplastic polymer sheet over part of the composite body. The method may comprise applying the thermoplastic polymer sheet over the composite body such that part of the composite body is not covered by the thermoplastic polymer sheet. The method may comprise applying the thermoplastic polymer sheet over the majority of an outward-facing surface of the composite body. The method may comprise applying the thermoplastic polymer sheet over the entirety of the outward-facing surface of the composite body.

The method may comprise applying the shield over a part of the composite body which is not covered by the thermoplastic polymer sheet and a part of the composite body which is covered by the thermoplastic polymer sheet.

The method may comprise applying adhesive between the thermoplastic polymer sheet and the composite body. Additionally or alternatively, the method may comprise applying adhesive between the shield and the composite body and/or the thermoplastic polymer sheet. For example, the method may comprise applying adhesive between the thermoplastic polymer sheet and the end of shield which overlies the thermoplastic polymer sheet. Additionally or alternatively, the method may comprise applying adhesive between a part of the composite body not covered by the thermoplastic polymer sheet and a part of the shield which does not overlie the thermoplastic polymer sheet. The method may comprise applying adhesive between the shield and the composite body and/or the thermoplastic polymer sheet in the shielded region. The method may comprise applying adhesive between the shield and the composite body and/or the thermoplastic polymer sheet prior to pressing the shield into the thermoplastic sheet.

Adhesive may be applied to the composite body, the thermoplastic polymer sheet and/or the shield. For example, the method may comprise: applying a first layer of adhesive to a part of the composite body; applying the thermoplastic polymer sheet over the first layer of adhesive; applying a second layer of adhesive to a part of the composite body not covered by the thermoplastic polymer sheet and to a part of the thermoplastic polymer sheet; and applying the shield over the second layer of adhesive, the shield terminating at an end which overlies the thermoplastic polymer sheet and defines an interface between shielded and unshielded regions of the component. Alternatively, the method may comprise: applying the first layer of adhesive to the thermoplastic polymer sheet; applying the thermoplastic polymer sheet to a part of the composite body such that the first layer of adhesive contacts the composite body; applying a second layer of adhesive to a part of the composite body not covered by the thermoplastic polymer sheet and to a part of the thermoplastic polymer sheet; and applying the shield over the second layer of adhesive, the shield terminating at an end which overlies the thermoplastic polymer sheet and defines an interface between shielded and unshielded regions of the component. In a further alternative, the method may comprise: applying the first layer of adhesive to a part of the composite body; applying the thermoplastic polymer sheet over the first layer of adhesive; applying the second layer of adhesive to the shield; and applying the shield over a part of the composite body not covered by the thermoplastic polymer sheet and to a part of the thermoplastic polymer sheet, the shield terminating at an end which overlies the thermoplastic polymer sheet and defines an interface between shielded and unshielded regions of the component. In yet a further alternative, the method may comprise: applying the first layer of adhesive to the thermoplastic polymer sheet; applying the thermoplastic polymer sheet to a part of the composite body such that the first layer of adhesive contacts the composite body; applying the second layer of adhesive to the shield; and applying the shield over a part of the composite body not covered by the thermoplastic polymer sheet and to a part of the thermoplastic polymer sheet, the shield terminating at an end which overlies the thermoplastic polymer sheet and defines an interface between shielded and unshielded regions of the component.

The adhesive (e.g. the first and/or or second layers of adhesive) may be a polymeric adhesive. The adhesive (e.g. the first and/or or second layers of adhesive) may comprise (e.g. be) a thermosetting resin. The adhesive (e.g. the first and/or or second layers of adhesive) may comprise (e.g. be) an epoxy resin.

The adhesive (e.g. the first and/or or second layers of adhesive) may be provided as a film. The film may have a weight from about 0.015 lb/ft$^2$ (i.e. about 74 g/m$^2$) to about 0.085 lb/ft$^2$ (i.e. about 417 g/m$^2$), for example about 0.060 lb/ft$^2$ (i.e. about 294 g/m$^2$). The film may have a nominal thickness from about 2.5 mils (i.e. about 0.06 mm) to about 13 mils (i.e. about 0.33 mm), for example about 10 mils (i.e. about 0.25 mm).

The adhesive (e.g. the first and/or second layers of adhesive) may be unsupported (e.g. an unsupported adhesive film). Alternatively, the adhesive (e.g. the first and/or second layers of adhesive) may be supported (e.g. a supported adhesive film). The adhesive (e.g. the first and/or second layers of adhesive) may be supported by a scrim material, for example having a weight of up to about 6 gsm. The scrim material may be formed from fine fibres of glass or carbon.

The component may be a fan blade. The composite body may be a composite fan blade body. The composite fan blade and/or the composite fan blade body may comprise a pressure surface and a suction surface, each extending between a leading edge and a trailing edge. The method may comprise: applying the shield over the leading edge and/or the trailing edge.

The component may be a guide vane. The composite body may be a composite guide vane body. The composite guide vane and/or the composite guide vane body may comprise a pressure surface and a suction surface, each extending between a leading edge and a trailing edge. The method may comprise: applying the shield over the leading edge and/or the trailing edge.

The method may comprise: applying more than one thermoplastic polymer sheet over the composite body for the component; applying the shield over part of the composite body, the shield terminating at an end which overlies at least one of the thermoplastic polymer sheets and defines an interface between shielded and unshielded regions of the component; and pressing the shield into the at least one of the thermoplastic polymers sheet so that the at least one thermoplastic polymer sheet deforms around the end of the shield, such that the exterior profile of the component at the interface between the shielded and unshielded regions is flush. The method may comprise applying more than one thermoplastic polymer sheet on top of one another over the composite body for the component. For example, where the composite component is a fan blade or a guide vane, the method may comprise applying more than one thermoplastic polymer sheet on top of one another over the pressure surface of the composite fan blade body or the composite guide vane body. The pressure surface of the composite fan blade or composite guide vane may suffer greater levels of erosion in use compared to the corresponding suction surface.

The component may be a nose cone. The composite body may be a composite nose cone body. The method may comprise: applying the shield over an apex of the composite nose cone body. The shield may be a nose cone spinner. The shield may comprise (e.g. be formed from) rubber.

According to a second aspect there is provided a component for a gas turbine engine manufactured according to the method of the first aspect. The component may be, for example, a fan blade, a guide vane, or a nose cone.

The component may be a composite component. The composite component may be, for example, a composite fan blade, a composite guide vane, or a composite nose cone.

According to a third aspect, there is provided a component for a gas turbine engine, the component comprising: a composite body; a thermoplastic polymer layer extending over the composite body; and at least one shield extending over part of the composite body, the or each shield terminating at an end which overlies the thermoplastic polymer layer and defines an interface between a respective shielded region and an unshielded region of the component, an exterior profile of the component at the or each interface between the shielded and unshielded regions being flush; wherein, at the end of the or each shield, the thermoplastic polymer layer has a discontinuous thickness, the thickness of the thermoplastic polymer layer between the shield and the composite body in the respective shielded region being lower than the thickness of the thermoplastic polymer layer in the unshielded region; and wherein the thermoplastic polymer layer covers a remainder of the composite body not covered by any of the at least one shield. Accordingly, the composite body is entirely covered by at least one of the thermoplastic polymer layer and a shield.

The thermoplastic polymer layer covering the remainder of the composite body not covered by any of the at least one shield may provide the remainder of the composite body with increased erosion resistance.

It will be appreciated that the or each shielded region of the component is a region of the component in which the composite body is covered by a shield and that the unshielded region of the component is a region of the component in which the composite body (i.e. the remainder of the composite body) is not covered by any shield.

The thickness of the thermoplastic polymer layer between the or each shield and the composite body in the respective shielded region may be at least 10% lower, for example, at least 20% lower, or at least 30% lower, or at least 40% lower, than the thickness of the thermoplastic polymer layer in the unshielded region. The thickness of the thermoplastic polymer layer between the or each shield and the composite body in the respective shielded region may be no greater than 90%, for example, no greater than 80%, or no greater than 70%, or no greater than 60%, of the thickness of the thermoplastic polymer layer in the unshielded region. The ratio of the thickness of the thermoplastic polymer layer between the or each shield and the composite body in the respective shielded region to the thickness of the thermoplastic polymer layer in the unshielded region may be between about 1:2 and about 9:10.

The thermoplastic polymer layer may comprise (e.g. be formed from) one or more thermoplastic polymers, for example one or more thermoplastic elastomeric polymers. The thermoplastic polymer layer may comprise (e.g. be formed from) one or more copolymers, for example one or more block copolymers.

It may be that the thermoplastic polymer layer comprises (e.g. is formed from) thermoplastic polyurethane (TPU), for example thermoplastic elastomeric polyurethane. It will be appreciated that thermoplastic polyurethane (e.g. thermoplastic elastomeric polyurethane) is a block copolymer comprising alternating sequences of hard and soft polymer segments formed on reaction of diisocyanates with short-chain diols and long-chain diols. It may be that the thermoplastic polymer layer comprises (e.g. is formed from) polyester-based thermoplastic polyurethane, for example polyester-based thermoplastic elastomeric polyurethane.

The thermoplastic polymer layer may have a thickness in the unshielded region from about 0.1 mm to about 1.0 mm, for example, from about 0.2 mm to about 0.8 mm, or from about 0.3 mm to about 0.6 mm.

The or each shield may comprise (e.g. be formed from) metal. It may be that the or each shield is a metal shield. The or each metal shield may comprise (e.g. be formed from) any suitable metal or metal alloy. The or each metal shield may comprise (e.g. be formed from) titanium or one or more titanium alloys. The or each shield may comprise sheet metal. The or each shield (e.g. the sheet metal) may have a thickness from about 0.1 mm to about 1.0 mm, for example, from about 0.2 mm to about 0.9 mm, or from about 0.3 mm to about 0.8 mm, or from about 0.3 mm to about 0.7 mm, or from about 0.3 mm to about 0.6 mm, or from about 0.3 mm to about 0.5 mm, towards the end which overlies the thermoplastic polymer sheet.

The or each shield may comprise (e.g. be formed from) polymeric material. The or each shield may comprise (e.g. be formed from) elastomeric material, e.g. one or more elastomeric polymers. The elastomeric material may comprise (e.g. be) one or more thermosetting elastomeric polymers or one or more thermoplastic elastomeric polymers. The or each shield may comprise (e.g. be formed from) natural or synthetic rubber, for example vulcanized rubber.

The composite body may comprise (e.g. be formed from) fibre-reinforced composite material, for example fibre-reinforced polymeric material. The fibre-reinforced composite material may comprise reinforcing fibres made of, for example, glass, carbon or aramids (e.g. para-aramids such as Kevlar® or Twaron®). The reinforcing fibres may be suspended in a thermosetting polymeric matrix, for example an epoxy resin matrix. The composite body may comprise (e.g. be formed from) glass-fibre reinforced plastic (GFRP or fibreglass) or carbon-fibre reinforced plastic (CFRP).

It may be that the end of the or each shield is chamfered. Alternatively, it may be that the end of the or each shield is not chamfered. It may be easier to manufacture a shield having an end which is not chamfered.

Adhesive may be provided between the thermoplastic polymer layer and the composite body. Additionally or alternatively, adhesive may be provided between the or each shield and the composite body and/or the thermoplastic polymer sheet.

The adhesive may be a polymeric adhesive. The adhesive may comprise (e.g. be) a (i.e. cured) thermosetting resin. The adhesive may comprise (e.g. be) an (i.e. cured) epoxy resin. The adhesive may be unsupported. Alternatively, the adhesive may be supported. The adhesive may be supported by a scrim material, for example having a weight of up to about 6 gsm. The scrim material may be formed from fine fibres of glass or carbon.

It may be that the component is a fan blade or a guide vane and the composite body is a composite fan blade body or a composite guide vane body, the fan blade or the guide vane and/or the fan blade body or guide vane body comprising a pressure surface and a suction surface, each extending between a leading edge and a trailing edge, and the or each shield extending over the leading edge and/or the trailing edge.

It may be that the component is a nose cone and the composite body is a composite nose cone body, a shield of the at least one shield extending over an apex of the nose cone body. The shield may be a nose cone spinner. The shield may comprise (e.g. be formed from) rubber.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

The fan of a gas turbine as described and/or claimed herein may have any desired number of fan blades, for example 16, 18, 20, or 22 fan blades.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF DRAWINGS

Embodiments will now be described by way of example only, with reference to the Figures, in which.

DETAILED DESCRIPTION

Figure 1:
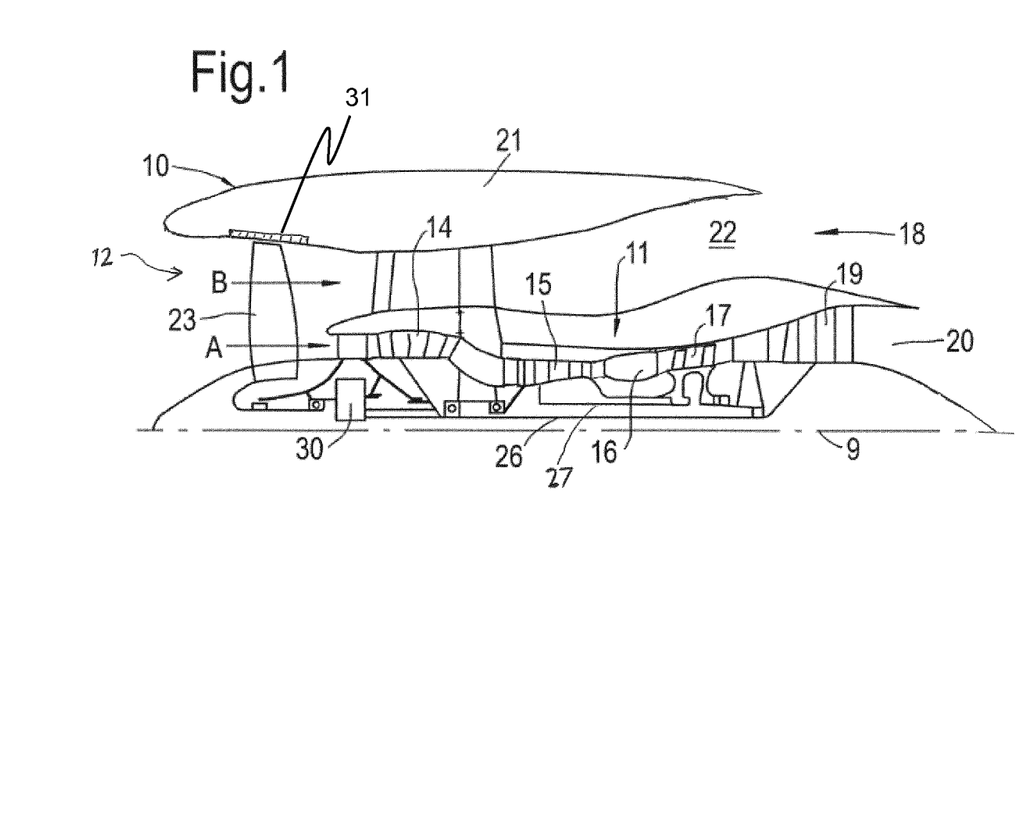
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. A fan containment arrangement 31 extends around the fan 23 inboard the nacelle 21.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
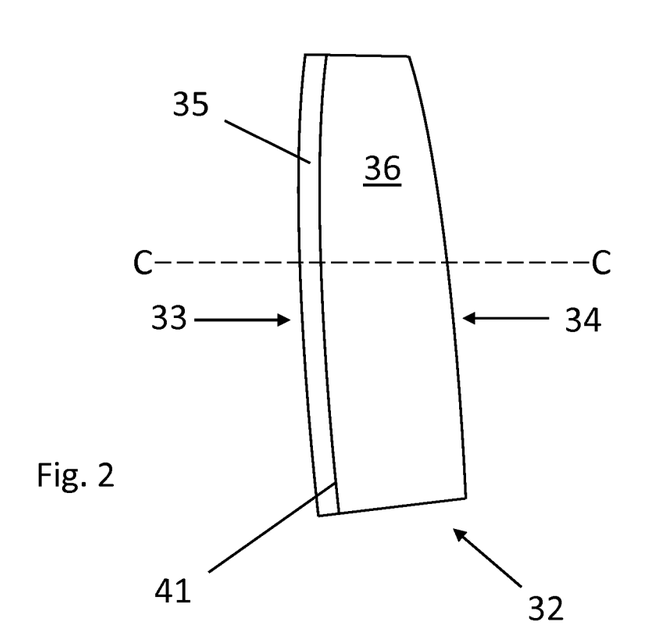
FIG. 2 is a side view of a shielded composite fan blade.

FIG. 2 shows an individual fan blade 32 in more detail. The fan blade 32 is a composite fan blade formed predominantly from carbon-fibre plies bonded to one another in a cured epoxy resin. Pressure and suction surfaces of the fan blade extend between a leading edge 33 and a trailing edge 34. An exterior surface of the fan blade 32 at the leading edge 33 is formed by a titanium shield 35. The remainder of the fan blade 32 not covered by the titanium shield 35 is covered by at least one layer of thermoplastic polyurethane (TPU) 36. The titanium shield 35 protects the leading edge of the blade 32 against foreign object damage as might occur, for example, on impact of birds or ice crystals. The layer of thermoplastic polyurethane 36 provides the remainder the fan blade with increased erosion resistance.

Figure 3:
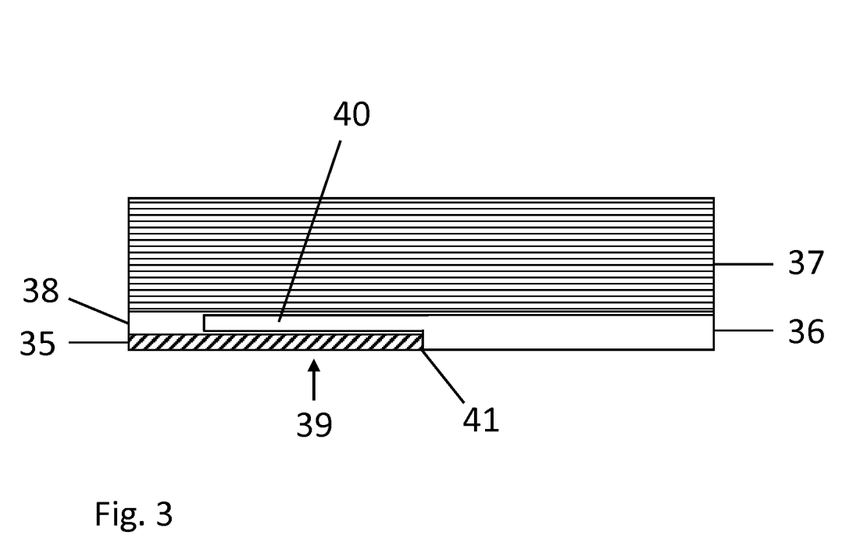
FIG. 3 is a sectional view of a surface of the shielded composite fan blade of FIG. 2 at an interface between shielded and unshielded regions.

FIG. 3 shows a portion of the pressure surface of the fan blade 32 at the interface between the titanium shield 35 and the TPU-coated remainder of the fan blade 32 in partial cross-section along line C-C. In FIG. 3 it can be seen that this portion of the fan blade is made up of a carbon-fibre laminate blade body 37, the TPU layer 36 and the titanium shield 35 bonded to one another by a cured epoxy adhesive 38 which extends between the TPU layer 36 and the carbon-fibre laminate blade body 37, between the titanium shield 35 and the carbon-fibre laminate blade body 37, and between the titanium shield 35 and the TPU layer 36. An end 39 of the titanium shield 35 overlies a part 40 of the TPU layer 36 which is thinner than the remainder of the TPU layer 36 not covered by the titanium shield 35. The external surfaces of the titanium shield 35 and the TPU layer 36 are flush with one another at the external interface 41. This flush interface 41 enables smooth air flow over the pressure surface of the blade from the leading edge towards the trailing edge.

Although FIGS. 2 and 3 show the titanium shield 35 located over the leading edge 33, it will be appreciated that a titanium shield may be located over the trailing edge 34, either instead of or in addition to the leading edge shield.

A method of producing the flush interface 41 is described with reference to FIG. 4. A first film of epoxy adhesive 42 is applied to the carbon-fibre laminate blade body 37 and a sheet of TPU 43 is applied to the first film of epoxy adhesive 42. A second film of epoxy adhesive 44 is also applied to the carbon-fibre laminate blade body 37 such that the second film 44 overlies part of the sheet of TPU 43. The titanium shield 35 is then applied to the second film of epoxy adhesive 44 such that end 39 also overlies the sheet of TPU 43. The assembly is then heated and pressure is applied in the direction indicated by arrow 45 to press the end 39 of the titanium shield 35 into the sheet of TPU 43. At elevated temperatures, the first and second epoxy adhesive films 42 and 44 liquefy and, at the same time, the sheet of TPU 43 softens. As pressure is applied to the assembly, the sheet of TPU 43 deforms. In particular, the sheet of TPU 43 flows plastically around the end 39 of the titanium shield 35 and between the titanium shield 35 and the carbon-fibre laminate blade body 37, causing the thickness of the TPU between the titanium shield 35 and the carbon-fibre laminate blade body 37 to be reduced relative the thickness of the TPU further away from the titanium shield 35. This process is continued until the external surfaces of the titanium shield 35 and the sheet of TPU are flush at the interface 41. As the temperature and the applied pressure are reduced, the epoxy adhesive cures and the TPU becomes less mouldable, fixing the position of the metal shield 35 relative to the blade body 37 and the layer of TPU 36.

Figure 5:
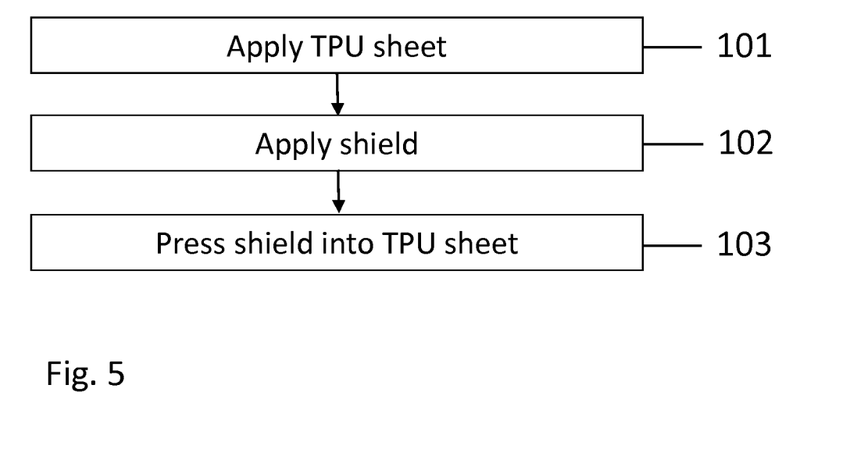
FIG. 5 is a flow diagram illustrating a method of manufacturing a shielded composite component.

A simplified method of attaching the titanium shield to the laminate body is illustrated in a flow diagram in FIG. 5. In block 101, the TPU sheet is applied to the laminate body. In block 102, the titanium shield is applied to the laminate body such that an end of the titanium shield overlies part of the TPU sheet. In block 103, the titanium shield is pressed into the TPU sheet to cause deformation of the TPU around the end of the titanium shield such that the exterior profile at the interface between shielded and unshielded regions is flush.

Figure 6:
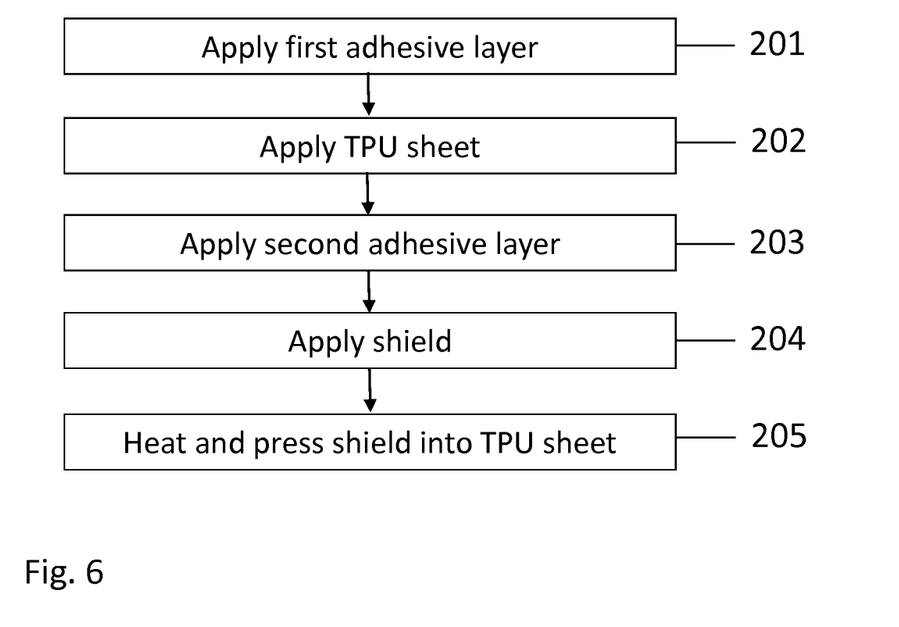
FIG. 6 is a flow diagram illustrating a method of manufacturing a shielded composite component.

The method is illustrated in a more detailed flow diagram in FIG. 6. In block 201, the first layer of epoxy adhesive is applied to the laminate body. In block 202, the TPU sheet is applied to the laminate body over the first layer of epoxy adhesive. In block 203, the second layer of epoxy adhesive is applied to the laminate body and over part of the TPU sheet. In block 204, the titanium shield is applied to the laminate body such that an end of the titanium shield overlies part of the TPU sheet. In block 205, the assembly of laminate body, TPU sheet, titanium shield, and first and second layers of epoxy adhesive, is heated and the titanium shield is pressed into the TPU sheet to cause deformation of the TPU around the end of the titanium shield such that the exterior profile at the interface between shielded and unshielded regions is flush.

It will be appreciated that the foregoing description relates to a specific embodiment of the invention and variations of the materials and methods used are possible.

For example, the composite fan blade body 37 may be made from any suitable composite material, such as glass fibre reinforced polymer (GFRP or fibreglass), carbon-fibre reinforced polymer (carbon fibre) or aramid fibre reinforced polymers, for example, containing Kevlar® or Twaron® fibres. The shield 35 may be formed from any suitable material, such as a metal or metal alloy or rubber. The layers 36 or sheets 43 of thermoplastic polyurethane may be replaced by any suitable thermoplastic polymers which soften on heating. Example thermoplastic polymers can be found in the range of thermoplastic polyurethane elastomer films available from 3M™ in thicknesses of 0.3 mm to 0.6 mm. The epoxy adhesive may be replaced by any adhesive suitable for use in aerospace applications and may be provided as a film supported by scrim materials, for example having a weight up to about 6 gsm. Suitable adhesives may be found, for example, in the ranges of structural adhesive films available from suppliers such as 3M™ or Henkel Ltd.

The composite fan blade body 37 can be manufactured using standard composite manufacturing techniques well-known in the field. For example, the composite fan blade body 37 may be manufactured by first laying up a preform for the composite fan blade body and subsequently curing the preform, for example in an autoclave. Laying up the preform may involve repeatedly applying layers of carbon-fibre plies to a shaped tool such as a mould. Carbon-fibre plies may be applied in the form of carbon-fibre tapes or sheets, particularly carbon-fibre tapes or sheets pre-impregnated with uncured matrix material such as an uncured resin. Alternatively, uncured matrix material may be injected into the preform after laying up has been completed. The preform may be shaped or formed prior to curing using any composite shaping or forming techniques known in the art.

Figure 4:
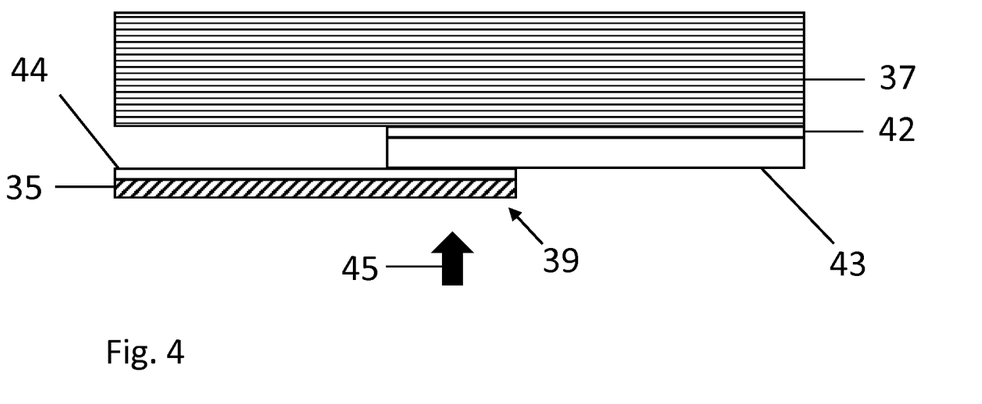
FIG. 4 is a sectional view of an assembly of components used in the manufacture of the shielded composite fan blade of FIG. 2.

During manufacture of the shielded fan blade, heat and pressure may be applied to the assembly shown in FIG. 4 using standard composite manufacturing techniques well-known in the field. For example, heat and pressure may be applied to the assembly in an autoclave. The autoclave may be set to heat the assembly to between 90° C. and 180° C. and to apply a pressure of between 1 bar (gauge) and 4 bar (gauge) over, for example, 2 to 6 hours. The assembly may be sealed inside a vacuum bag prior to entry into the autoclave. A tool such as a mould may be used to press the shield into the thermoplastic polyurethane and the mould may also define the external profile of the finished component. For example, the mould may shape the external surface of the thermoplastic polyurethane, e.g. by smoothing the external surface of the thermoplastic polyurethane and thereby compensating for irregularities in the underlying composite fan blade body surface. The mould may be a pressure intensifier mould (i.e. a thin silicone rubber moulding of a mould used in manufacture of the composite fan blade body) inserted into the vacuum bag with the assembly prior to entry into the autoclave. The mould may be flexible but, when applied against the external surface of the thermoplastic polyurethane and shield, the mould should have sufficient local flexural rigidity in the region of the interface to press the shield into the thermoplastic polyurethane to provide a flush interface.

Figure 7:
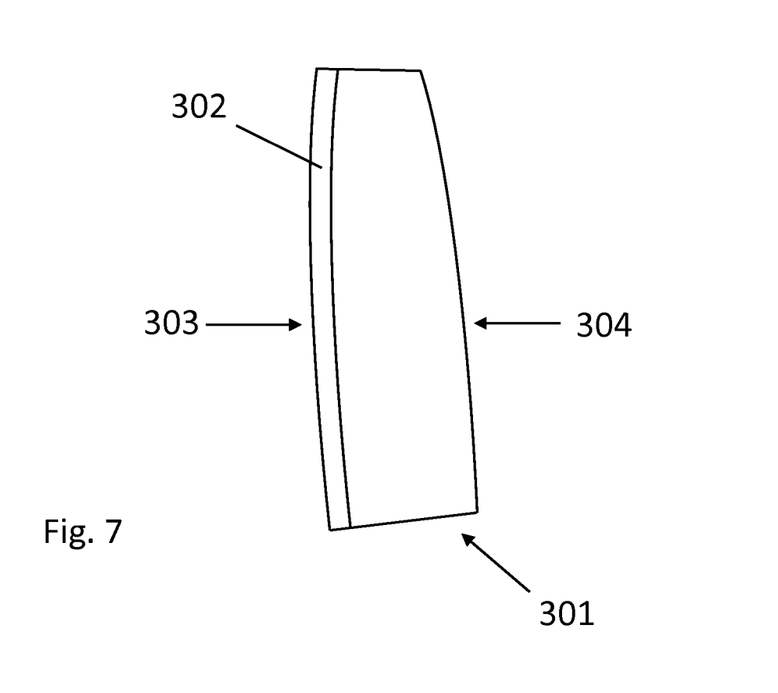
FIG. 7 is a side view of a shielded composite guide vane.
Figure 8:
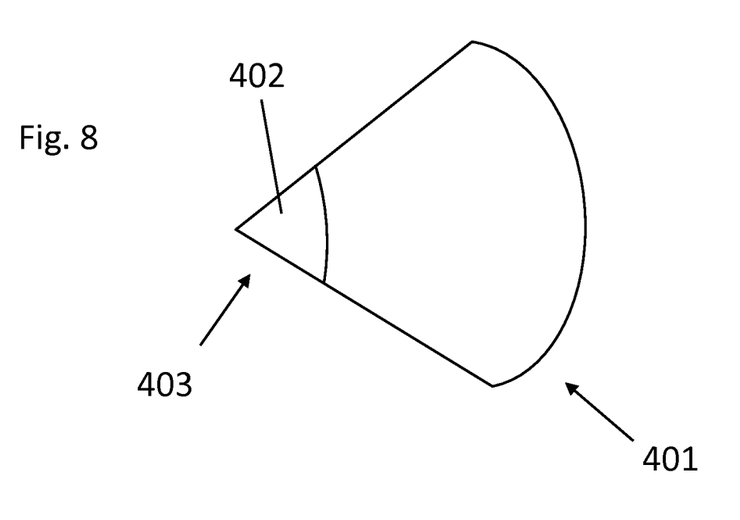
FIG. 8 is a side view of a shielded nose cone.

It will be clear to the person skilled in the art that the method may be adapted for use in the manufacture of other shielded components for gas turbine engines. For example, the method can be used to manufacture shielded composite guide vanes or shielded composite nose cones. An example shielded composite guide vane 301, as shown in FIG. 7, includes a metal shield 302 located over a leading edge 303 and an unshielded trailing edge 304. An example shielded composite nose cone 401, as shown in FIG. 8, includes a rubber shield 402 located over an apex 403 of the nose cone. In each case, the application of pressure and heat enables the shield (either metal shield 302 or rubber shield 402) to be pressed into the corresponding layer of TPU, thereby forming a flush interface between shielded and unshielded regions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a component for a gas turbine engine, the method comprising:
applying a thermoplastic polymer sheet over a composite body for the component;
applying a shield over part of the composite body, the shield terminating at an end which overlies the thermoplastic polymer sheet and defines an interface between shielded and unshielded regions of the component; and
pressing the shield into the thermoplastic polymer sheet so that the thermoplastic polymer sheet deforms around the end of the shield, such that an exterior profile of the component at the interface between the shielded and unshielded regions is flush.

2. The method according to claim 1 comprising:
pressing the shield into the thermoplastic polymer sheet so that the thermoplastic polymer sheet deforms around the end of the shield such that the thermoplastic polymer sheet has a discontinuous thickness at the end of the shield.

3. The method according to claim 2 comprising:
pressing the shield into the thermoplastic polymer sheet so that the thermoplastic polymer sheet deforms around the end of the shield such that the thickness of the thermoplastic polymer sheet between the shield and the composite body is reduced relative to the thickness of the thermoplastic polymer sheet in the unshielded region.

4. The method according to claim 1 comprising:
pressing the shield into the thermoplastic polymer sheet using a tool which defines a profile for the component.

5. The method according to claim 1, wherein the thermoplastic polymer sheet comprises thermoplastic polyurethane.

6. The method according to claim 1, wherein the shield is a metal shield.

7. The method according to claim 1, wherein the end of the shield is chamfered.

8. The method according to claim 1 further comprising:
applying adhesive between the thermoplastic polymer sheet and the composite body; and/or
applying adhesive between the shield and the composite body and/or the thermoplastic polymer sheet.

9. The method according to claim 8, wherein the adhesive is supported by a scrim material.

10. The method according to claim 1, wherein the component is a fan blade or a guide vane and the composite body is a composite fan blade body or a composite guide vane body, wherein the composite fan blade body or the composite guide vane body comprises a pressure surface and a suction surface, each extending between a leading edge and a trailing edge, and wherein the method comprises:
applying the shield over the leading edge and/or the trailing edge.

11. The method according to claim 1, wherein the component is a nose cone, the composite body is a composite nose cone body, and the method comprises:
applying the shield over an apex of the composite nose cone body.

12. A component for a gas turbine engine manufactured according to a method comprising:
applying a thermoplastic polymer sheet over a composite body for the component;
applying a shield over part of the composite body, the shield terminating at an end which overlies the thermoplastic polymer sheet and defines an interface between shielded and unshielded regions of the component; and
pressing the shield into the thermoplastic polymer sheet so that the thermoplastic polymer sheet deforms around the end of the shield, such that an exterior profile of the component at the interface between the shielded and unshielded regions is flush.

13. The component according to claim 12, wherein the thermoplastic polymer sheet forms a layer covering a remainder of the composite body not covered by the shield.

14. A component for a gas turbine engine, the component comprising:
a composite body;
a thermoplastic polymer layer extending over the composite body; and
at least one shield extending over part of the composite body, the or each shield terminating at an end which overlies the thermoplastic polymer layer and defines an interface between a respective shielded region and an unshielded region of the component, an exterior profile of the component at the or each interface between the shielded and unshielded regions being flush;
wherein at the end of the or each shield, the thermoplastic polymer layer has a discontinuous thickness, the thickness of the thermoplastic polymer layer between the or each shield and the composite body in the respective shielded region being lower than the thickness of the thermoplastic polymer layer in the unshielded region; and
wherein the thermoplastic polymer layer covers a remainder of the composite body not covered by any of the at least one shield.

15. The component according to claim 14, wherein the component is a fan blade or a guide vane and the composite body is a composite fan blade body or a composite guide vane body, the fan blade or the guide vane comprising a pressure surface and a suction surface, each extending between a leading edge and a trailing edge, and the or each shield extending over the leading edge and/or the trailing edge.

16. The component according to claim 14, wherein the component is a nose cone and the composite body is a composite nose cone body, a shield of the at least one shield extending over an apex of the nose cone body.

* * * * *